United States Patent Office 3,483,009
Patented Dec. 9, 1969

3,483,009
UNIVERSAL COLOR BASE FOR COATING COMPOSITIONS
Victor M. Willis, Homewood, Ill., assignor to The Sherwin-Williams Company, Cleveland, Ohio, a corporation of Ohio
No Drawing. Continuation-in-part of application Ser. No. 616,748, Jan. 24, 1967. This application Aug. 9, 1968, Ser. No. 751,376
Int. Cl. C08h 17/02, 15/00
U.S. Cl. 106—287
12 Claims

ABSTRACT OF THE DISCLOSURE

This invention relates to improved universal color bases for tinting or coloring base coating compositions or vehicles, and particularly adapted for use in conjunction with water-containing coating compositions, as well as water-free coating compositions, and more particularly to improved universal color bases which are characterized by the presence therein of the wetting agent system, and a universal color base composed of a mixed oxazoline ring containing cyclic-aliphatic ester of an oxazoline, the precursor of which is a tris(hydroxy-alkyl) amino alkane and a pigment.

---

This application is a continuation-in-part of my co-pending application Ser. No. 616,748 filed Jan. 24, 1967, now abandoned.

The improved color bases of the present invention, by virtue of the wetting agent system contained therein, are useful not only in the coating compositions characterized by an aqueous medium, but also as color bases for coating compositions which contain no water and are characterized by a more conventional vehicle system such as, for example, an oleoresinous system, or an oil-modified alkyd resin vehicle system. In the following disclosure, reference will be had, for illustrative purposes, to latex or emulsified binder systems. It will be understood, however, that such reference is not to be regarded as limitation on the present invention, but merely as an illustration, it being further understood that the color bases of the present invention are useful also in coating compositions, characterized by water soluble binders, as well as coating compositions which contain no water, but are of the conventional formulations applicable as woodwork enamels for both interior and exterior use, and including outside house paints and the like.

It has been indicated that the compositions of the present invention are an improvement upon certain universal color bases. These latter color bases are characterized by a pigment dispersed in a particular type of vehicle which is a mixed aliphatic-cyclic ester of an oxazoline, the precursor of which is a tris(hydroxy-alkyl) amino alkane. The universal color bases will be described in greater detail subsequently.

It has been found that these universal color bases may be improved and their utility extended by including therein a certain wetting agent system, hereinafter more particularly described. Generally speaking, the wetting agent system itself includes a relatively high molecular weight nonionic wetting agent (M.W. 550–3000) and an anionic wetting agent. These wetting agents may be used in the range of from 99:1 to 1:99, and preferably are present in about equal proportions, such proportions being by weight. In view of the fact that compositions consisting of the pigment, the mixed aliphatic-cyclic ester, and the relatively high molecular weight wetting agent system are often quite thick and buttery, it is frequently desirable to employ diluents and/or solvents for purposes of controlling this consistency and rendering the improved color base easier to handle. The color bases of this invention are also an improvement upon those described in prior Patents 2,809,122 and 2,878,135.

Using the interior latex emulsion type paint business as exemplary of one area of the coating composition field wherein the products of the present invention find particular utility, current marketing techniques tend toward the maintenance of no more than a few, and preferably only one base coating composition, from which a broad palette of colors may be made by the addition of predetermined amounts of one or more "tinting bases." Thus, the paint store, instead of carrying an inventory of a large number of colors in pint, quart, gallons and even five-gallon quantities, will stock more profitably pints, quarts, gallons and even five-gallon containers of a white or pastel color base coating composition. Such a paint outlet will also be provided with color chips illustrating a large palette of colors obtainable by mixing pursuant to formula identifiable from each of said color chips. In this way, the inventory of materials required by such a paint outlet is reduced to one or a few stock coating compositions, a supply of "tinting bases" usually contained in collapsible tubes of predetermined volumes, and a catalog of colors and associated formulas for making such colors, the latter formulas usually being expressed in terms of one or more tubes of a given volume of one or more specific color bases and a predetermined volume of a base paint, e.g., a white base paint.

It also frequently occurs in trade sales of this nature that the customer desires a given color in a coating composition especially designed for wall covering, such as a butadiene-styrene latex emulsion type paint, and the identical color in an enamel type composition, such as an oil-modified alkyd resin base vehicle particularly suited for coating or re-coating woodwork. The improved color bases of the present invention satisfy this two-fold requirement in that they are compatible not only with the latex emulsion coating compositions, but also with the oil-modified alkyd type coating composition. This further minimizes the inventory which must be maintained by the paint outlet. Heretofore, a separate palette of tinting bases was required for each individual binder, or vehicle system. Now, a single palette of colors provides a tinting system which is adaptable to a variety of vehicle systems.

Still further, utilization of such color bases need not be confined to paint outlets. In some cases, it is not possible for the paint outlet to stock materials even so extensively as base color or colors, tube colors, chips and formulas. It is still necessary for the paint manufacturer to package and distribute coating compositions adapted for application to a wide varietty of surfaces and in a wide variety of colors for many if not all of such surfaces. The color bases of the present invention also find great utility as factory shading bases for a wide variety of vehicle systems including aqueous systems and organic solvent-resin systems. Such versatility greatly simplifies manufacturing procedures and inventory.

As indicated above, the color bases of the present invention are characterized by a wetting agent system and a universal color base which comprises two essential components. The wetting agent system comprises preferably, albeit not essentially, two ingredients, one of which is anionic and the other of which is nonionic. The wetting agent system may consist of a single type of wetting agent of which there may be one or more species present.

Anionic wetting agents useful in accordance with the present invention include the nonmetallic, ammonium or substituted ammonium salts of the alkyl-substituted aromatic sulfonic acids, and particularly amine salts of alkyl-substituted benzene sulfonic or naphthalene acids. The alkyl group preferably contains 8 to 18 carbon atoms. More than one alkyl substituent may be present upon the benzene or naphthalene nucleus, i.e., 1 to 3 substituents, so as to confer oil solubility, i.e., solubility in the organic moiety of the coating composition into which the color bases of this invention are to be incorporated.

Among the nonmetallic salt-forming materials which may be used in synthesizing the anionic wetting agents useful in accordance herewith are the $C_1$ to $C_6$ alkyl cycloalkyl and hydroxyalkyl primary and secondary amines such as, for example, di-methyl amine, ethyl amine, di-ethyl amine, n-propyl amine, iso-propyl amine, di-iso-propyl amine, n-butyl amine, iso-butyl amine, tert. butyl amine, n-amyl amine, n-hexyl amine, ethanolamine, di-ethanolamine, propanolamine, iso-propanolamine, di-iso-propanolamine, cyclohexyl amine, etc. These salt-forming materials provide one form of hydrophilic moiety of the wetting agents useful in accordance herewith. Also included among the salt-forming materials are the alkali metals, e.g. sodium, lithium potassium and cesium.

The aromatic sulfonic acid moiety or the oilophilic portion is preferably a monocyclic, alkyl-substituted aryl, e.g. benzene sulfonic acid. As indicated, one or more alkyl groups of sufficient length to confer solubility in oil upon the resultant salt are required. Generally, the alkyl groups contain from 8 to 18 carbon atoms, and may be branched or straight chain, saturated or unsaturated. Typical examples of alkyl substituent groups which may appear in these molecules include n-octyl, 2-ethyl hexyl, nonyl, decyl, undecyl, dodecyl, cetyl, octadecyl, etc.

Any of the foregoing salt-forming materials may be used to form anionic wetting agents from any of the foregoing alkyl substituted aromatic sulfonic acids. Exemplary anionic wetting agents include, therefore, the ethyl amine salt of dodecyl benzene sulfonic acid; the di-ethyl amine salt of dodecyl benzene sulfonic acid; the iso-propyl amine salt of the dodecyl benzene sulfonic acid; the di-iso-propyl amine salt of the dodecyl benzene sulfonic acid; the hydroxy ethyl amine salt of dodecyl benzene sulfonic acid; the iso-propyl amine salt of cetyl benzene sulfonic acid; the tert. butyl amine salt of octadecyl benzene sulfonic acid; the cyclohexylamine salt of decyl benzene sulfonic acid; the cyclohexyl amine salt of isopropyl naphthalene sulfonic acid, sodium salt of dodecyl benzene sulphonic acid, sodium mahogany sulphonate, potassium dodecyl benzene sulphonate, potassium mahogany sulphonate, lithium octadecyl benzene sulphonate, lithium mahogany sulphonate, cesium undecyl benzene sulphonate, dioctyl sodium sulfosuccinate, and the like. In general, these salts have molecular weights ranging from about 300 to about 510.

Another class of wetting agents useful with the color bases of the present invention comprises the nonionic wetting agents which are characterized by solubility both in water and in organic media, e.g., linseed oil. The principal class of such wetting agents includes the group consisting of alkyl polyoxyalkylene ethanols and propanols, and aliphatic carboxylic acid esters thereof, and alkyl phenoxy polyoxyalkylene ethanols and propanols wherein the alkyl group is a $C_4$ to $C_{12}$ carbon atom chain and the oxyalkylene groups number from 7 to 50 and are, in turn, selected from ethylene oxide and propylene oxide adducts; and the carboxylic acid, when used, contains from 8 to 20 carbon atoms. Molecular weights of the useful surface active agents for these purposes may range from about 500 to 3000. Those agents containing an aryl nucleus are preferred.

Many members of this class of materials are available commercially and include specifically, octyl phenoxy polyethoxy ethanol where the number of ethoxy groups averages ten. Where the wetting agent includes an aryl group, the molecular weights are generally less than in the purely aliphatic members of the class. The purely aliphatic variety of nonionic agent is illustrated by the monobutyl ether of polypropylene glycol of a molecular weight of 1400, reacted with a sufficient amount of ethylene oxide to raise the final molecular weight to about 2800. This product is also referred to as a monobutyl ether, a polyoxyalkanoxy ethanol of M.W. about 2800, and more generically as an alkyl polyoxyalkylene ethanol wherein the alkyl group is a $C_4$ to $C_{12}$ chain, and the polyoxyalkylene portions of the molecule are derived from ethylene oxide or propylene oxide. Specific esters of the poly(oxyalkylene) alkanols include poly(oxyethylene) monolaurate (9–15 EtO); poly(oxypropylene) monoricinoleate (5–20 PrO); poly(oxyethylene) mono-oleate (9–15 EtO); etc. These agents are readily soluble in water. In practice, the nonionic agents containing a phenoxy group show up consistently well and are therefore preferred materials.

The above nonionic agents may be prepared by condensing an alkylene oxide with an alkyl phenol to provide a plurality of alkylene oxide groups in the molecule. Usually, from 45% to 75% by weight of the molecule of the nonionic agent is alkylene oxide. The polyoxylated alkyl phenols are formed by well-known procedures from alkyl phenols. The alkyl group or groups attached to the phenol nucleus may contain from 8 to 12 carbon atoms. Thus, octylphenol, nonylphenol, decylphenol, undecylphenol and dodecylphenol are principal alkyl phenols which are submitted to the polyoxylation procedure, which is well known. Under controlled conditions, these alkyl phenols may be alkoxylated, e.g., ethoxylated or propoxylated, to contain a plurality of alkoxy groups. Ordinarily from 7 to 50 moles of the alkoxylating agent are condensed with the alkyl phenol to provide nonionic wetting agents useful in accordance herewith. Molecular weights of the useful nonionic agents range about 500 to about 3000. Accordingly, specific examples of alkoxylated alkylphenol nonionic wetting agents useful in accordance herewith include ethoxylated octylphenol containing 61% ethylene oxide; ethoxylated nonylphenol containing 63% ethylene oxide; ethoxylated dodecylphenol (9–11 moles EtO); ethoxylated nonylphenol (9–11 moles of EtO); propoxylated octylphenol (8 to 10 moles of PrO).

As indicated above, these wetting agents are utilized in formulating a wetting agent system for use in the color bases of this invention by combining with the universal color bases hereinafter more particularly described. Where the anionics and nonionics are used together, they are combined in a ratio of anionic to nonionic within the range from 99:1 to 1:99 on a weight basis.

The first essential ingredient of the universal color bases useful in accordance with the present invention is a solid particulate pigmentary material. Pigments vary in their ease of dispersion in color bases of the type of the present invention, just as they vary in their ease of dispersion in other vehicles. It has been determined that the most difficultly dispersible materials currently in wide use readily dispersible in the vehicles of the present invention to form stable color bases at adequate pigment volume concentrations, and thus it follows that all other pigments which are more readily dispersible exhibit the same readier dispersibility in the coating compositions of the present invention. Thus, the pigments useful in accordance with the present invention include all solid particulate pigmentary materials which are nonreactive with the present systems, and specifically include titanium dioxide in any of its various pigmentary forms, lampblack, carbon black, red iron oxide, ferrite yellow, medium chrome yellow, phthalocyanine blue, both red and green shades, Milori blue, iron oxide, cadmium sulfide, ultramarine blue, chromium oxide, hydrated chromium oxide, phosphotungstic acid green, chrome orange, cadmium selenide, cadmium sulfide, benzidine yellows, Hansa yellows, zinc chromate, etc. The nature of the pigmentary material makes little or no difference in the color bases of the present invention. Any solid particulate pigmentary material of conventional pigment size, e.g., 325 mesh, or sizes, may be used in accordance with this invention. The fact that the first pigmentary materials mentioned above can be used to form satisfactory color base compositions pursuant to this invention is indicative that any other pigmentary material may be satisfactorily and successfully used.

The second essential ingredient of the universal color bases useful in accordance with the present invention is, as indicated above, a mixed aliphatic-cyclic ester of an oxazoline, the precursor of which is a poly(hydroxyalkyl) amino alkane, especially those which are formed by the treatment of such hydroxy amino compounds with both aliphatic mono-carboxylic acid having an iodine value less than 160, and preferably being saturated, and a monocyclic mono-carboxylic acid, to produce a normally liquid material which demonstrates essentially Newtonian behavior, which is nonpolymeric, and which is nondrying. The alkyl and alkane groups each contain 1 or 2 carbon atoms. These esters are characterized by the presence therein of a heterocyclic ring containing 5 members herein identified as an "oxazoline ring." Under the conditions of the formation of the esters of the present invention, there is formed an oxazoline ring. Thus, this heterocyclic ring is a characterizing feature of the novel vehicles of the present invention. Additionally, the esters of the present invention are formed by reacting with a tris-(hydroxy alkyl) amino alkane, a relatively high molecular weight aliphatic acid having an iodine value less than 160 in an amount which is less than that which would be required to satisfy all of the amine and hydroxyl functionality of the hydroxyl-amine compound, a monocyclic monocarboxylic acid to complete the esterification of the available hydroxyl in the hydroxyl-amine compound, either sequentially or simultaneously.

Where one might expect that a material, such as, tris-(hydroxyl methyl) amino methane, would be tetra-functional, one of the things which occurs when such a material is reacted in part with an aliphatic carboxylic acid is a ring formation whereby an oxazoline ring is formed. Accompanying the ring formation operation, one of the functionalities of the compound is removed. Thus, the tris-hydroxy-alkyl amino alkanes with which the present invention is concerned are tri-functional as distinct from tetra-functional with respect to reaction with carboxylic acids. In a preferred embodiment, esterification of the hydroxyl groups with an aliphatic carboxylic acid of the straight chain or branched chain type is carried out to the extent of not more than two of the available functionalities, i.e., amine and hydroxyl. The balance of the functional content of the hydroxy alcohol, usually hydroxyl, is then satisfied with a cyclic acid, preferably a monocarboxylic cyclic acid, desirably an aromatic acid.

The resulting composition, then, is usually a mixture of mixed aliphatic-cyclic acid esters of tris-hydroxy amino compound. The amount, therefore, of the aliphatic acid generally ranges from 0.8 mol to 2 mols of such aliphatic carboxylic acid to 1 mol of the tris-hydroxy amino compound. The amount of the cyclic carboxylic acid usually ranges, therefore, from 2.2 to 1 mol of such acid to each mol of the tris-hydroxy compound, the amount of the cyclic acid in combination with the aliphatic acid being that which is sufficient to balance stoichiometrically the amine and hydroxyl content of the amino alcohol which is used, or just slightly less.

It becomes convenient at this point to identify still further the nature of the tri-hydroxy amino compound which is useful in accordance with this invention, the nature of the aliphatic carboxylic acid which is useful in accordance herewith, and the nature of the cyclic acid.

As indicated above, the principal building block of the present condensation products is a tri-(hydroxy-alkyl) amino alkane. These materials upon reaction readily form a heterocyclic oxazoline ring. Thus, particularly suitable materials for use as the amine and hydroxy providing portion of the oxazoline-containing esters of this invention include tris - (hydroxy-methyl) amino methane; tri-(hydroxy-ethyl) amino ethane; di-(hydroxy-methyl) mono-(hydroxy-ethyl) amino methane; tris-(hydroxy-methyl) amino ethane; and the like. The preferred material is the tris-(hydroxy-methyl) amino methane.

The aliphatic acids useful in accordance with the present invention are preferably saturated straight chain, or they may be satuated branch chain. Best results are secured in respect of compatibility with coating compositions of the types above-mentioned when the aliphatic acid is a saturated mono-carboxylic aliphatic acid characterized by branching in the chain, and preferably branching at the carbon atoms remote from the carboxylic group, and especially a terminal iso-, or a tertiary group. The aliphatic acids useful in accordance herewith may contain from 5 to 18 carbon atoms, the preferred aliphatic acids containing from 8 to 12 carbon atoms. These acids are not ordinarily obtainable as pure materials, and consequently, commercial aliphatic acids are used in accordance herewith which commercial acids constitute or comprise mixtures of aliphatic acids containing, for example, from 8 to 10 carbon atoms. As indicated with the commercial mixtures, compounded mixtures of the foregoing aliphatic acids may be employed.

The cyclic acids useful in accordance herewith are mono-cyclic and mono-carboxcyclic, preferably aromatic mono-carboxcyclic. Thus, benzoic acid and substituted benzoic acids, e.g., toluic acids, i.e., 2-methyl benzoic acid, 3-methyl benzoic acid, 4-methyl benzoic acid, xylic acids, i.e., hemellitic acid, 2,5-dimethyl benzoic acid, 2,6-dimethyl benzoic acid, o-methoxy benoic acid, m-methoxy benzoic acid, 2-ethyl benzoic acid, p-tert.-butyl benzoic acid, p-chlorobenzoic acid, trimethyl benzoic acids, and other alkyl-substituted benzoic acids, or alkoxy benzoic acid, or halogen-substituted benzoic acids, per se, or natural or synthetic mixtures of such acids, e.g., rosin acids.

The following description, utilizing "tris amino" [tris-(hydroxy-methyl)aminomethane] as an example of a preferred starting material, will illustrate theoretical and practical aspects of this invention, it being understood that other amino compounds could be used in a corresponding manner to produce corresponding base vehicle materials.

In the preparation of these tris amino condensates for the universal pigment base vehicle, a mixture of aliphatic and cyclic mono-carboxylic acids has been used. The aliphatic acids have included straight and branched chain acids. The cyclic acids have been limited to benzoic, substituted benzoic and rosin acids. All of these acids are listed below with descriptive data.

TABLE I.—ACID COMPONENTS—TRIS AMINO CONDENSATES

| Acid | M. Wt. | Description |
|---|---|---|
| Straight Chain: | | |
| Stearic | 284.47 | $C_{18}$ straight chain saturated acid. |
| Pelargonic Acid | 158 | $C_9$ straight chain acid (nonanoic). |
| Valeric | 102 | $C_5$ straight chain acid (pentanoic). |
| Branched Chain: | | |
| Primary: | | |
| Isodecanoic Acid | 172.27 | Dimethyl Octanoic, Trimethyl Hepanoict. |
| Isooctanoic Acid | 144 | Mixture of Isomeric Branched Chain Acids with eight carbon atoms. |
| Isononanoic Acid | 158 | 90% 3,5,5-trimethyl hexanoic acid, 10% mixture of isomeric branched 9 carbon atom acids. |
| ICI 8-10 Acid | 156 | Trimethyl Hexanoic. |
| Decanoic Acid | | 3,4,5-trimethyl Heptanoic. |
| Secondary: | | |
| 2-ethyl Hexoic Acid | 144.22 | |
| Tertiary: | | |
| Versatic 9-11 Acid | 184 | Mixture of saturated mainly tertiary monocarboxylic |
| | 187 | acids having a $C_9$, $C_{10}$, $C_{11}$ chain length. |
| | | $R_2-\underset{R_3}{\overset{R_1}{C}}-COOH$ One R group=$CH_3$ All R groups=straight chain. |
| | | 10% secondary acid; 90% tertiary. Small proportion of tertiary acids are cyclic, principally pentane ring cyclics. |
| Neopentanoic | | 99% Trimethylacetic acid (Pivalic). |
| Neoheptanoic Acid | 102.04 | 90% 2,2-dimethylpentanoic, 10% 2-ethyl, 2-methyl butanoic. |
| Neodecanoic Acid | | Neotridecanoic acid. Substitution similar to neodecanoic but based on a $C_{11}$ chain. |
| Neotridecanoic Acid | | |
| Aromatic Acids: | | |
| Benzoic Acid | 122.12 | |
| Para tertiary Butyl Benzoic Acid | 178.23 | |
| Rosin Acids | *350 | Acidic resin (A.V. 160). |

*Typical analysis: Abietic acid, 18%; Dehydroabietic acid, 22%; Dihydroabietic acid, 46%; Tetrahydroabietic acid.

PROCESSING PROCEDURES

Actual processing of these condensates has involved several variations which may or may not affect their performance. A limited few have been essentially fusion processed but the greater number have been solvent processed.

Solvent used have been mainly toluene and xylene. Solvent concentration has ranged from 2% to 10%. It has been added in various increments controlled to a large degree by the rate of the water liberated. The reflux can become too vigorous when a large amount of solvent is present at a point when substantially amounts of water are being liberated. As high as 10% has been charged, but this is not always feasible. An initial charge of 3%, with the rest added as reflux permits, works well.

Acids have been added in three different ways including (1) initial charge of both aliphatic and cyclic acid, (2) prereaction of the aliphatic acid component, and (3) prereaction of the cyclic acid component. The procedure would affect the acid substitudent directly attached to the oxazoline ring.

Reactions were monitored by amount of water evolved, and acid value to determine extent of reaction. Some difficulties were encountered on occasion in achieving the desired acid value. The acid value difficulty could result from (1) inconsistency in the acid value of the acid; (2) small weight errors; (3) loss of tris amino or tris amino carboxylate; and (4) sluggishness of reaction in later stages possibly due to steric hindrance.

A final acid value of 10 is acceptable for most purposes, but water systems may more desirably use a product with an acid value less than 5. Consequently, some condensates were formulated with a definiciency of acid and an excess of hydroxyl to achieve this lower value. This is exemplified later.

The three procedures for processing are described below. They are applicable for both fusion and solvent processing.

(I) The acids are charged to a reaction vessel with agitation, heating source, inert gas inlet, thermometer, condenser and water trap. After heating to 225° F., the tris amino is added. Solvent (3%-10%) is charged as water reflux will permit. Usually an increment of 3% can be added initially although all 10% has been added. A nitrogen blanket is used as well as solvent. The batch is heated gradually to 395° to 420° F. and held for an acid value of 10 or less. Solvent is removed by blowing and the batch is removed. (See Example 11 in Table II.) Top temperature was 397° F. Final acid value was less than 5 because it is an Example 10 type based on a deficiency of acid and an excess of hydroxyl.

(II) The same equipment as above-described would be used. In this case the aliphatic acid would be charged, heated to 225° F. and the tris amino added. A nitrogen blanket is used as well as solvent. Three to 10% toluene or xylene can be used as reflux solvent. There has been indications of faster reaction at the 10% level or xylene. Oxazoline ring formation is faster in the presence of higher boiling solvents such as xylene because the temperature can be brought to a higher level. The temperature in the first stage has varied from 350° to 420° F. based on solvent used and water liberated,. However, based on reaction rate and the boiling points of the components, a range of 380°-400° F. is preferable.

After the reaction of the first state has progressed to an acid value of 0 to 5, the cyclic acid is added and the reaction continued at temperatures of 390°-425° F. to an acid value of less than 10, and in some cases less than 5. (See Examples 9 and 10.)

The specific compositions and procedures delineating these condensates are given below. These examples also show the use of excess hydroxyl with an acid deficiency to achieve the lower acid value condensate. The example numbers refer to an accompanying table where properties are given for a varied group of condensates. These are preferred examples.

Tris Amino Isodecanoate Benzoate (No Excess Hydroxyl)

| | Grams | Moles |
|---|---|---|
| Tris Amino | 363 | 3 |
| Isodecanoic Acid | 1,038 | 6 |
| Benzoic Acid | 366 | 3 |

Charge isodecanoic acid into a flask equipped with agitator, condenser, water trap and inert gas. Maintain an inert gas blanket throughout. Heat to 225° F. Add tris amino. Add 5% toluene for reflux. Heat to 350° F. and hold for an acid value of 0-2. Cut heat. Add benzoic acid. Heat to 350° F., then raise temperature to 390-395° F.

Hold to an acid value less than 10. (See Example 9 in Table II.)

Tris Amino Isodecanoate Benzoate (Excess Hydroxyl)

|  | Grams | Moles |
|---|---|---|
| Tris Amino | 665 | 5.5 |
| Isodecanoic Acid | 1,903 | 11 |
| Benzoic Acid | 611 | 5.01 |

Charge isodecanoic acid into a flask equipped with agitator, condenser, water trap and inert gas. Maintain inert gas blanket. Heat to 225° F. Add tris amino and 5% toluene for reflux. Heat to 350° F. and hold for an acid value of 0–5. Cut heat. Add benzoic acid. Heat to 350° F. initially, then raise temperature to 390–395° F. In the later stages, use a nitrogen below to implement removal of water. Hold for an acid value of less than 5. (See Example 10 in Table II.)

Both condensates could also be made by charging all ingredients initially and heating gradually to 350° F. and then to 390°–395° F. and holding for final acid value.

(III) The procedure would be the same as (II) except the cyclic acid would be charged first and the reaction continued as above. (See Examples 16 and 17.)

As previously explained, tris amino will react with three moles of acid. The acid ratios thus have ranged from 3 moles of aliphatic acid to 3 moles of armoatic acid. The latter (tribenzoate) was not practical since it was a solid. The most interesting properties seem to result between the 1.5/1.5 and the 2/1 aliphatic to aromatic acid ratio. In the accompanying tables the various molar compositions and acid variations have been delineated. The end product is probably not a single compositon, but a family of products. In a mixture of isodecanoic and benzoic acid the product could contain the triisodecanoate, the diisodecanoate-monobenzoate and the mono-isodecanoate-dibenzoate providing transfer reactions are limited. This would apply under Process II. If Process I or II were used the tribenzoate might also be present.

Of the aliphatic acids the branched chain type have been the most successful. It is difficult to state that the position of the branch is critical when considering the differences between versatic acid and isodecanoic or isononanoic acid, since all three have been successful. Perhaps, it is primarily the branched character per se which is most important.

TABLE II.—GROUPS

Group I presents the straight chain fatty acid-aromatic acid condensates prepared. Cooking times include both reactions. Characteristics are for the final products.

Group II gives the isodecanoic and Versatic-rosin acid condensates.

Group III presents the various molar ratios of isodecanoic to benzoic acid between (3/0 to 0/3) and an isodecanoic para-tert. butyl benzoic acid (PTBBA) condensate. The "one stage" indicates that all reactants were charged initially.

Group IV presents the various OH/COOH ratios studied in the isodecanoic-benzoic condensate.

Group V presents the process variations tried with the excess OH type. These include initial charge of all ingredients (Example 15) and prereaction of the aromatic acid (Examples 16 and 17). The latter indicates less satisfactory oxazoline ring formation.

Group VI delineates the prereaction of isononanoic acid versus prereaction of benzoic acid. Again oxazoline ring appears lower. Example 19 was a repeat of Example 18 in which the AV did not drop as desired. The residual hydroxyl again was essentially close to zero. It is presented because the isononanoic was the same sample used in Example 20. However, it was a 5-gal. batch versus a flask for Example 20.

Groups VII and VIII present the respective isononanoic and isooctanoic-benzoic condensates. Example 29 is a repeat of Example 28 whose temperature hit 480° F. It appears that the isooctanoic-benzoic condensate at the 1.5/1.5 ratio yields a lower oxazoline ring content.

Group IX gives the various ratios of 2-ethylhexoic to benzoic acid studied. Hydroxyl excesses were used because of some difficulty in completing reaction. 2-ethylhexoic is a secondary acid.

Group X treats the same 2-ethylhexoic with PTBBA. A tendency to crystallization at 1.5 and 2/1 ratios of PTBBA was noted in examples not reported in Table II. Again, hydroxyl excess was used.

TABLE II.—NOTES

OH/COOH: Total ratio of amine and hydroxyl in tris amino to carboxyls in acids.

Modifications: i.e., process or composition. Ex.: *One stage.*—Reactants all charged initially; *Benzoic First.*—indicates prereaction of benzoic acid in the first stage rather than the aliphatic acid (Process III).

Process: Fusion or solvent or combination. Solvent addition noted for stage where possible. In some cases addition may be gradual throughout. Arrows indicate continuous presence of solvent charged in 1st stage.

Reflux cook time: Represents approximate time within the range of cook temperatures used; heat-up times excluded.

Percent theoretical $H_2O$: Represents the percent of water removed versus that theoretically possible. This may vary slightly due to calculation bases, namely (1) total theoretical water or that at this (2) particular acid value. Except where the acid value is high, the difference is not significant.

Percent oxazoline ring: Calculated based on final acid value, water removed, and yield solids or approximate yield (charge water removed).

In summary, then, the vehicles of the present invention are preferably produced by first interacting a $C_4$–$C_{18}$ aliphatic monocarboxylic acid, which is preferably saturated and branched, with the amino alcohol, and the acid value carried to about 5. From 1 to 2.5 moles of aliphatic acid per mole of amino alcohol (tris amino compound) are used. Thereafter, the cyclic acid, which is preferably monocyclic and monocarboxylic, is added and the cooking continued until the final acid value is reached. This is usually in the range of from 1 to 10. From 0.5 to 2 moles of cyclic acid per mole of amino alcohol are used, the total of aliphatic and cyclic acid being equal to or slightly less than stoichiometric. When the carboxylic acids are blended prior to reaction with the amino alcohol, the resulting structure is somewhat uncertain. In the ester, then, the molar ratio of the aliphatic moiety to the cyclic moiety will generally be in the range of from about 1:2 to 5:1, respectively.

The amount of combined aliphatic acid and cyclic acid, whether sequentially or simultaneously reacted with the amino alcohol, is desirably either a stoichiometric ratio or slightly less.

In conducting the esterification reaction, from 0.01% to 1.0% of a catalyst may be employed, although preferably not until after ring formation has occurred. Suitable catalysts include triphenyl phosphite and lithium carbonate. With some catalysts, color formation tends to be a problem, and, therefore, it is desirable to carry out these reactions over the somewhat prolonged period of from 7 to 50 hours necessary to obtain the desired acid value in the absence of a catalyst. No color difficulty was experienced with triphenyl phosphite, however. Also, this catalyst may be added at the beginning of the first stage. It has been found that the presence of solvent such as aromatic hydrocarbon tends to promote oxazoline ring formation, a desired and characterizing feature of the esters of this invention. From 1% to 10% by weight of the esterification mixture of solvent is added as early as possible in the reaction. Specific aromatic hydrocarbon solvents include benzene, toluene and xylene. The solvent

TABLE II

| Ex. No. | Gr. No. | Aliphatic Acid | Aromatic Acid | Acid Ratio | OH/COOH | Modified | Process Stage 1 | Process Stage 2 | Reflux Cook Time | °F. Cook Temp. Stage 1 | °F. Cook Temp. Stage 2 | Percent Theo. H₂O | Percent Oxazoline Ring | Acid Value | Percent Solids | G-H Color | Viscosity G-H |
|---|---|---|---|---|---|---|---|---|---|---|---|---|---|---|---|---|---|
| 1 | I | n-Nonanoic | Benzoic | 1.8/1 | 1.073 | | 5% Toluene gradually | | 24:40 | 300–363 | 380–390 | 85.1 | 39.8 | 1.1 | 98.9 | 9–10 | G– |
| 2 | II | iso-Decanoic | Rosin acids | 2/1 | 1.000 | | 4.2% Toluene | | 20:05 | 300–360 | 392 | 91.4 | 67.0 | 9.2 | 94.3 | 18 | Z₄++ |
| 3 | III | Versatic | | 1/2 | 1.000 | | 5% Toluene | | 28:20 | 350–360 | 395–400 | 93.6 | 75.5 | 10.5 | 94.2 | | |
| 4 | III | iso-Decanoic | Benzoic | 2.5/0.5 | 1.000 | | Fusion | | 42:50 | 300–360 | 390–395 | 94.3 | 74.7 | 4.6 | 96.7 | 8 | J |
| 5 | III | do | do | 2/1 | 1.000 | | 1.4% Toluene... 1,4=Toluene | | 19:00 | 300–350 | 360–425 | 99.5 | 96.3 | 8.8 | 90.4 | 10 | P– |
| 6 | III | iso-Decanoic | Benzoic | 1.5/1.5 | 1.000 | | 6.9% Toluene gradually | | 38:00 | 300–360 | 392 | 99.8 | 98.1 | 4.5 | 98.1 | 13–14 | X |
| 7 | III | do | do | 1/2 | 1.000 | | 5.0% Toluene gradually | | 19:25 | 300–357 | 360–390 | 93.2 | 73.2 | 9.9 | 96.2 | 16 | Z₄ |
| 8 | IV | do | PTBBA* | 2/1 | 1.000 | | 5.0% Toluene gradually | | 28:20 | 350–350 | 350–390 | 92.8 | 71.8 | 10.5 | 96.1 | 13 | Z₄ |
| 9 | IV | do | Benzoic | 2/1 | 1.000 | | 1.4% Toluene... 1.4=Toluene | | 19:00 | 300–350 | 360–425 | 99.5 | 96.3 | 8.8 | 90.4 | 10 | P– |
| 10 | IV | do | do | 2/0.91 | 1.031 | | 5% Toluene gradually | | 24:20 | 300–350 | 350–402 | 94.3 | 76.8 | 2.8 | 93.1 | 12 | R |
| 11 | IV | iso-Decanoic | Benzoic | 2/0.91 | 1.031 | One Stage | 5% Toluene gradually | | 21:05 | 300–397 | 350–390 | 93.5 | 72.3 | 3.9 | 98.1 | 12 | S– |
| 12 | IV | do | do | 2/0.75 | 1.091 | | 5% Toluene gradually | | 30:15 | 300–357 | | 94.5 | 74.7 | 1.4 | 97.9 | 11+ | T |
| 13 | IV | do | do | 1.83/0.92 | 1.088 | | 5% Toluene gradually | | 30:45 | 300–354 | 315–405 | 94.7 | 80.2 | 0.7 | 98.2 | 14 | U |
| 14 | V | do | do | 2/0.91 | 1.031 | | 5% Toluene gradually | | 24:20 | 300–380 | 350–402 | 94.3 | 76.8 | 2.8 | 93.1 | 12 | R |
| 15 | V | do | do | 2/0.91 | 1.031 | One Stage | 5% Toluene | | 21:05 | 300–397 | | 93.5 | 72.3 | 3.9 | 98.1 | 12 | S– |
| 16 | V | iso-Decanoic | Benzoic | 2/0.91 | 1.031 | Benz. first | 5% Toluene gradually | | 29:40 | 300–377 | 350–395 | 89.4 | 10.0 | 46.0 | 86.1 | 18+ | V |
| 17 | VI | do | do | 2/0.91 | 1.031 | do | 5% Toluene gradually | | 27:45 | 300–356 | 350–440 | 65.5 | None | 19.9 | 94.7 | 18+ | T |
| 18 | VI | iso-Nonanoic | do | 1.5/1.5 | 1.000 | | 3% Xylene | 3=Xylene | 11:35 | 300–419 | 346–410 | 94.6 | 84.6 | 7.4 | 89.9 | 4 | O |
| 19 | VI | do | do | 1.5/1.5 | 1.000 | | 10% Xylene initially | | 22:05 | 280–372 | 339–410 | 92.2 | 81.7 | 16.5 | 90.7 | 12–13 | Z₄ |
| 20 | VI | do | do | 1.5/1.5 | 1.000 | Benz. first | 3% Xylene | | 14:30 | 300–406 | 320–420 | 76.9 | 40.5 | 9.6 | 96.5 | 14–15 | Z₄+ |
| 21 | VII | iso-Nonanoic | Benzoic | 2/1 | 1.000 | | 3% Xylene | 3=Xylene | 10:00 | 300–400 | 333–420 | 96.4 | 85.7 | 8.7 | 90.2 | 4–5 | J |
| 22 | VII | do | do | 1.75/1.25 | 1.000 | | 3% Xylene | 3=Xylene | 12:33 | 300–414 | 358–416 | 98.8 | 95.1 | 10.2 | 94.0 | 11 | V |
| 23 | VII | do | do | 1.75/1.0 | 1.093 | | 3% Xylene | 3=Xylene | 11:50 | 300–418 | 332–398 | 97.2 | 89.5 | 8.1 | 88.8 | 13–14 | S |
| 24 | VII | do | do | 1.5/1.5 | 1.000 | | 3% Xylene | 3=Xylene | 11:35 | 300–419 | 364–410 | 94.6 | 84.6 | 7.4 | 89.9 | 4 | O |
| 25 | VIII | iso-Octanoic | do | 2/1 | 1.000 | | 3% Xylene | 3=Xylene | 13:05 | 300–390 | 340–400 | 95.0 | 80.2 | 7.2 | 88.5 | 9–10 | H |
| 26 | VIII | iso-Octanoic | Benzoic | 1.75/1.25 | 1.000 | | 3% Xylene | 3=Xylene | 11:35 | 328–410 | 354–420 | 97.7 | 91.6 | 7.4 | 95.1 | 11 | R |
| 27 | VIII | do | do | 1.75/1 | 1.086 | | 3% Xylene | 3=Xylene | 8:00 | 327–410 | 354–410 | 96.5 | 87.0 | 6.7 | 89.0 | 7 | L |
| 28 | VIII | do | do | 1.5/1.5 | 1.000 | | 3% Xylene | 3=Xylene | 27:40 | 326–398 | 336–480 | 82.3 | 35.0 | 7.5 | 94.9 | 17–18 | W |
| 29 | VIII | do | do | 1.5/1.5 | 1.000 | | 3% Xylene | 3=Xylene | 20:20 | 320–410 | 325–420 | 85.1 | 48.6 | 10.1 | 96.5 | 12 | X+ |
| 30 | IX | 2-ethylhexoic | do | 2/1 | 1.000 | | 10% Xylene gradually | | 17:00 | 300–406 | 400–410 | 94.4 | 85.2 | 8.6 | 94.8 | 13 | D–E |
| 31 | IX | 2-ethylhexoic | Benzoic | 1.5/1.5 | 1.000 | | 10% Xylene initially | | 24:00 | 350–380 | 366–420 | 97.0 | 88.4 | 10.4 | 87.4 | 18+ | N |
| 32 | IX | do | do | 1.497/1.497 | 1.002 | | 10% Xylene gradually | | 26:00 | 340–420 | 364–420 | 97.1 | 88.8 | 7.0 | 92.5 | 18++ | R |
| 33 | IX | do | do | 1.455/1.455 | 1.028 | | 10% Xylene gradually | | 17:45 | 316–388 | 360–424 | 99.9 | 99.1 | 4.9 | 93.5 | 18++ | M |
| 34 | IX | do | do | 1.456/1.411 | 1.046 | | 10% Xylene gradually | | 23:50 | 290–385 | 360–415 | 98.7 | 95.0 | 7.2 | 93.8 | 13 | G |
| 35 | IX | do | do | 1.94/0.97 | 1.031 | | 10% Xylene gradually | | 34:00 | 314–423 | 336–420 | 94.4 | 78.5 | 8.0 | 88.3 | 17–18 | G |
| 36 | IX | 2-ethylhexoic | Benzoic | 0.97/1.94 | 1.031 | | 10% Xylene gradually | | 30:00 | 314–406 | 346–420 | 95.7 | 83.2 | 6.5 | 91.8 | 18+ | M |
| 37 | X | do | PTBBA* | 2/0.91 | 1.031 | | 6% Xylene | | 32:50 | 328–390 | 364–410 | 97.5 | 98.6 | 18.0 | 83.9 | 16 | G |

*PTBBA=Para-tert.-butyl benzoic acid.

may be added prior to reaction, or initially, or it may be added gradually in the course of the esterification.

The reaction is usually carried out in two stages, in the first of which the temperature is gradually increased to a maximum from about 375° to 420° F., preferably 375° F. to 400° F. Following the addition of the second acid, the temperature is increased, usually to a range of 390° F. to 425° F., where the reaction is maintained till an acid value of 10 or below, preferably below 5, is reached. Higher temperatures may be used in the second stage but are generally not considered preferable.

The *total* reaction time may vary from 7 to 50 hours. The time for a given stage of the reaction is determined by arrival at a predetermined acid value or acid value range. The final acid value of the vehicles of this invention is 10 or below, and preferably below 5. Following the addition of the second acid, the temperature may be increased, usually to within a few degrees of 425° F. where the reaction is maintained for a period of time approximately equal in time to stage one, that is, from 7 to 50 hours, and as indicated above, the acid value is generally less than 10. The time for a given stage of the reaction is determined by arrival at a predetermined acid value or within a range of acid values.

At the conclusion of the reaction, any solvent which has been used is desirably stripped off, if this can be done conveniently without impairing the color of the vehicle. Usually from 1% to 10% of the end product constitutes solvent due to difficulty in removing all of the solvent without sacrificing color.

In general, the vehicles of this invention produced in accordance herewith generally have the following characteristics:

| | |
|---|---|
| Acid value | 1–10 |
| Color (Gardner-Holdt) (clear) | 4–18 |
| Viscosity (Gardner-Holdt) | D–$Z_6$ |
| Weight per gallon lbs | 7.9–9.1 |
| Solids percent | 82–99 |
| Oxazoline do | 60–100 |
| Molecular weight | 450–503 |

The color bases of the present invention are an improvement upon the universal color bases described and claimed in application Ser. No. 611,372 filed Feb. 24, 1967, by James A. Arvin and Mary G. Brodie, the disclosure of which is incorporated herein by reference.

Inclusion of the rather specific wetting agent systems of the present invention renders the universal shading composition of the aforementioned Ser. No. 611,372 more adaptable for use in a wide variety of coatings compositions, and particularly including latex emulsion type coating compositions, wet or soluble binder compositions, and oil-modified alkyd enamel type compositions.

Particularly suitable anionic-nonionic wetting agent systems include the following:

Example S–1

| | Parts |
|---|---|
| Iso-propyl amine salt of dodecyl benzene sulfonic acid | 50 |
| Ethoxylated nonylphenol (63% EtO) | 50 |

Example S–2

| | |
|---|---|
| Iso-propyl amine salt of dodecyl benzene sulfonic acid | 99 |
| Ethoxylated nonylphenol (65% EtO) | 1 |

Example S–3

| | |
|---|---|
| Iso-propyl amine salt of dodecyl benzene sulfonic acid | 1 |
| Ethoxylated nonylphenol (63% EtO) | 99 |

Example S–4

| | |
|---|---|
| Di-ethylene salt of octyl decyl benzene sulfonic acid | 30 |
| Ethoxylated octylphenol (61% EtO) | 60 |

Example S–5

| | |
|---|---|
| Tertiary butyl amine salt of n-octadecyl benzene sulfonic acid | 30 |
| Ethoxylated dodecylphenol (9 moles EtO) | 70 |

The nonionic and the anionic wetting agents of the present compositions are preferred because they coact together acting as mutual solubilizing agents for the other. In both aqueous and nonaqueous media, and while neither one of the wetting agents alone would demonstrate such universality of solubility in a broad range of concentrations, this range of concentration tolerated by either type of solvent medium, i.e. aqueous or nonaqueous, is greatly expanded by the presence of the other type of wetting agent in the combination comprising the system.

The color bases of the present invention are formed by adding the foregoing wetting agents (either anionic or nonionic) or wetting agent systems (including both anionic and nonionic) or their equivalent, to previously prepared universal color bases formed by grinding pigmentary material into one of the examples of vehicles such as those illustrated in Table II. As indicated above, the grinding is carried out by conventional attrition mill means, and a predetermined amout of the wetting agent system merely added to the color bases. The weight ratio of the wetting agent system to the vehicle is in the range of from 0.1:1 to 1:1, and preferably 0.2:1 to 0.5:1.

The following examples illustrate color bases of preferred compositions for use in forming the specific color bases of the present invention:

Example CB–1

| | Parts by weight |
|---|---|
| Titanium dioxide | 62.5 |
| Vehicle of Example 9, Table II | 9.0 |

Example CB–2

| | |
|---|---|
| Ferrite yellow pigment | 38.0 |
| Vehicle of Example 9, Table II | 3.2 |

Example CB–3

| | |
|---|---|
| Medium chrome yellow pigment | 65.0 |
| Vehicle of Example 10. Table II | 5.4 |

Example CB–4

| | |
|---|---|
| Copper phthalocyanine (blue) pigment | 20.0 |
| Vehicle of Example 9, Table II | 4.0 |

Example CB–5

| | |
|---|---|
| Lampblack | 11.0 |
| Vehicle of Example 9, Table II | 24.0 |

Example CB–6

| | |
|---|---|
| Carbon black | 12.5 |
| Vehicle of Example 9, Table II | 20.5 |

As indicated above, these universal color bases are prepared by merely grinding the pigments into the vehicles to a predetermined Hegman grind, for example 7+. The weight ratio of pigment to vehicle is in the range of 0.2:1 to 15:1, and preferably in the range of 0.45:1 to 12:1.

The following examples are formulations for mixing color bases in accordance with the present invention which are particularly useful in formulating latex emulsion coating compositions, or water soluble binder coating compositions, or lacquers, or enamels, or outside house paint formulations. It will be seen, therefore, that these materials are useful substantially independently of the type of vehicle or binder which characterizes the coating composition. These mixing color bases were prepared by adding the wetting agent systems of the preceding set of examples bearing the S– numbers to the color bases of the next set of examples bearing the CB– numbers to give compositions, typical examples of which have the following analyses. In these examples, additional solvents have been included to regulate the viscosity, these solvents being in the nature of diluents for the mixing color bases.

Example MCB-1

|   | Parts by weight |
|---|---|
| Copper phthalocyanine Green B toner | 300 |
| Wetting agent system of Example S-3 | 100 |
| Vehicle of Example 9, Table II | 200 |
| Methyl ethyl ketoxime | 7 |
| Mineral spirits (odorless) | 330 |

Example MCB-2

| Copper phthalocyanine Green B toner | 300 |
|---|---|
| Wetting agent system of Example S-1 | 100 |
| Vehicle of Example 9, Table II | 200 |
| Methyl ethyl ketoxime | 7 |
| Mineral spirits (odorless) | 330 |

Example MCB-3

| Copper phthalocyanine Green B toner | 300 |
|---|---|
| Wetting agent system of Example S-2 | 100 |
| Vehicle of Example 9, Table II | 200 |
| Methyl ethyl ketoxime | 7 |
| Mineral spirits (odorless) | 330 |

Example MCB-4

| Yellow iron oxide | 900 |
|---|---|
| Wetting agent system of Example S-1 | 100 |
| Vehicle of Example 9, Table II | 200 |
| Methyl ethyl ketoxime | 7 |
| Mineral spirits (odorless) | 290 |

The following examples of mixing color bases illustrate the use of either anionic or nonionic wetting agents as distinct from a combination of the two types. These mixing color bases are also useful as coating composition colorants in the same manner as previously stated.

Example MCB-5

|   | Parts by weight |
|---|---|
| Red iron oxide | 400 |
| Ethoxylated nonyl phenol (63% EtO) | 100 |
| Vehicle of Example 9, Table II | 200 |
| Mineral spirits (odorless) | 330 |

Example MCB-6

| Red iron oxide | 400 |
|---|---|
| Iso-propyl amine salt of dodecyl benzene sulfonic acid | 100 |
| Vehicle of Example 9, Table II | 200 |
| Mineral spirits (odorless) | 330 |

Example MCB-7

| Red iron oxide | 400 |
|---|---|
| Poly(oxyethylene) monolaurate (9-EtO) | 100 |
| Vehicle of Example 9, Table II | 200 |
| Mineral spirits (odorless) | 330 |

Example MCB-8

| Red iron oxide | 400 |
|---|---|
| Sodium dodecyl benzene sulfonate | 100 |
| Vehicle of Example 9, Table II | 200 |
| Mineral spirits (odorless) | 330 |

Example MCB-9

| Red iron oxide | 400 |
|---|---|
| Dioctyl sodium sulphosuccinate | 100 |
| Vehicle of Example 9, Table II | 200 |
| Mineral spirits (odorless) | 330 |

Example MCB-10

| Red iron oxide | 400 |
|---|---|
| Sodium petroleum mahogany sulfonate | 45 |
| Vehicle of Example 9, Table II | 200 |
| Mineral spirits (odorless) | 330 |
| Mineral oil | 9 |
| Water | 34 |

Various pigments which have been found to perform satisfactorily in systems of the foregoing types include acidic lampblack, copperas derived red iron oxide, nickel azo couples, Hansa yellow G, naphthol red, quinacridone red, indo maroon, copper phthalocyanine blue, and chromium oxide green. Many other pigment types are operative in compositions in accordance with this invention but are not normally utilized in colorants that go into a variety of paint products.

The foregoing compositions are typical examples of the present invention. These skilled in the art will be able to formulate numerous other examples in accordance with the teachings hereof using different pigments and different vehicles from the chart comprising Table II, as well as different wetting agent systems in accordance herewith.

What is claimed is:

1. A mixing color base useful in water base coating compositions comprising as essential ingredients:
    (a) a paint pigment;
    (b) a Newtonian, normally liquid, nonpolymeric, non-drying mixed aliphatic-cyclic ester of an oxazoline, the precursor for which is a tris(hydroxy alkyl) amino alkane wherein:
        (1) the alkyl group contains 1 carbon atom and the alkane group contains 1 to 2 carbon atoms;
        (2) the aliphatic moiety is derived from a saturated aliphatic mono-carboxylic acid containing from 5 to 18 carbon atoms;
        (3) the cyclic moiety is derived from a mono-cyclic mono-carboxylic acid, the molar ratio of aliphatic moiety to cyclic moiety being in the range of from about 1:2 to 5:1;
    (c) an anionic wetting agent selected from the group consisting of the ammonium, sodium, potassium, lithium, cesium, and alkyl $C_1$ to $C_6$ substituted ammonium salt of a $C_8$ to $C_{18}$ alkyl substituted aryl sulphonic acid; and
    (d) a nonionic wetting agent selected from alkyl polyoxyalkylene ethanols, alkyl polyoxyalkylene propanols, alkyl phenoxy polyoxyalkylene ethanols and alkyl phenoxy polyoxyalkylene propanols and aliphatic carboxylic acid esters thereof, wherein the alkyl group is a $C_4$ to $C_{12}$ carbon chain and the oxyalkylene groups number from 7 to 50 and are, in turn, derived from ethylene oxide and propylene oxide, and the aliphatic carboxylic acid contains from 8 to 20 carbon atoms, components (c) and (d) being present in a weight ratio of from 99:1 to 1:99, respectively, the weight ratio of component (a) to component (b) being in the range of from 0.2:1 to 15:1 and the weight ratio of the sum of components (c) and (d) to component (b) being in the range of 0.1:1 to 1:1.

2. A color base in accordance with claim 1, wherein part (c) the $C_8$ to $C_{18}$ alkyl substituted aryl sulphonic acid is dodecyl benzene sulphonic acid.

3. A color base in accordance with claim 2, wherein in part (c) the alkyl substituted ammonium compound is iso-propyl amine.

4. A color base in accordance with claim 1, wherein in part (d) the oxyalkylene group is derived from ethylene oxide.

5. A color base in accordance with claim 4, wherein in part (d) the alkyl substituent on the phenol is nonyl.

6. A color base in accordance with claim 5, wherein the percentage of ethoxy group is 63% by weight.

7. A color base in accordance with claim 1, wherein (c) is the iso-propyl amine salt of dodecyl benzene sulphonic acid and (d) is ethoxylated nonyl phenol containing about 63% ethylene oxide by weight.

8. A color base in accordance with claim 1, wherein in part (b) the tris-(hydroxy-alkyl) amino alkane is tris-(hydroxy-methyl) amino methane.

9. A color base in accordance with claim 8, wherein the aliphatic moiety is derived from iso-decanoic acid.

10. A color base in accordance with claim 8, wherein the cyclic moiety is derived from benzoic acid.

11. A color base in accordance with claim 8 wherein the aliphatic moiety is derived from iso-decanoic acid, and the cyclic moiety is derived from benzoic acid.

12. A color base in accordance with claim 1, wherein (c) is the iso-propyl amine salt of dodecyl benzene sulphonic acid, and (d) is ethoxylated nonyl phenol containing about 63% ethylene oxide by weight.

References Cited
UNITED STATES PATENTS

| | | | |
|---|---|---|---|
| 3,389,145 | 6/1968 | Katz | 260—307 |
| 3,353,973 | 11/1967 | Jensen | 106—308 |
| 2,942,997 | 6/1960 | Bram | 106—308 |
| 2,893,886 | 7/1959 | Erskine et al. | 106—272 |
| 2,878,135 | 3/1959 | Willis | 106—308 |
| 2,809,122 | 10/1957 | Willis et al. | 106—308 |
| 2,504,951 | 4/1950 | Tryon | 260—307 |

JULIUS FROME, Primary Examiner

T. MORRIS, Assistant Examiner

U.S. Cl. X.R.

106—308